United States Patent [19]

Watts et al.

[11] 3,959,242

[45] May 25, 1976

[54] SILANE GRAFTED POLY(VINYL ALCOHOL) FILM

[75] Inventors: William A. Watts, Akron; Warren K. Pierce, Tallmadge, both of Ohio

[73] Assignee: The Goodyear Tire & Rubber Company, Akron, Ohio

[22] Filed: Aug. 12, 1974

[21] Appl. No.: 496,593

[52] U.S. Cl. .............................. 526/9; 260/29.6 H; 260/67 S; 260/67 UA; 260/79.3 M; 260/79.5 NV; 260/79.7; 260/825; 526/29; 526/79; 526/90; 526/217; 526/225; 526/208; 526/279; 427/133; 428/447
[51] Int. Cl.² ..................... B05D 3/06; C08F 8/42
[58] Field of Search ........... 260/825, 91.3 VA, 87.3, 260/85.7, 67 S, 67 UA, 79.3 M, 79.5 NV, 79.7, 80 PS; 450/603, 604; 428/447

[56] References Cited
UNITED STATES PATENTS

| | | | |
|---|---|---|---|
| 2,441,066 | 5/1948 | Hanford | 260/46.5 |
| 2,489,225 | 5/1949 | Morris | 260/230 |
| 3,408,420 | 10/1968 | Wiggill | 260/827 |
| 3,528,998 | 9/1970 | Tesoro | 260/348 |
| 3,870,766 | 3/1975 | Chadha | 260/825 |

*Primary Examiner*—Stanford M. Levin
*Attorney, Agent, or Firm*—F. W. Brunner; H. C. Young, Jr.

[57] ABSTRACT

A thermoplastic composition suitable as a mold release surface for preparing cast articles which comprises a silane grafted poly(vinyl alcohol) prepared by the method which comprises incrementally reacting a selected silane with the poly(vinyl alcohol) characterized by having a molecular weight in the range of about 5,000 to about 150,000, by having a 4 weight percent aqueous solution viscosity at 20°C in the range of about 5 to about 65 centipoises, and by containing about 70 to about 98 weight percent vinyl alcohol units.

14 Claims, No Drawings

SILANE GRAFTED POLY(VINYL ALCOHOL) FILM

This invention relates to a thermoplastic prepared from a poly(vinyl alcohol) resin and a silane. The invention particularly relates to a release coating of such a thermoplastic for cast films and molded articles.

Poly(vinyl alcohol) and vinyl alcohol copolymers have long been used as mold release coatings for the preparation of molded articles. The release coating is generally applied and adhered to the mold itself to facilitate easy removal of the molded article therefrom. For example, such coatings have been used in automated processes on a moving belt for producing cast articles such as thin films. The poly(vinyl alcohol) coating has been of particular value because it can provide a surface having a release characteristic which enables cast articles with high surface gloss to be easily removed from their molds. However, in automated systems, it has long been many times desired to provide an improved release agent surface to prepare molded articles, such as thin films, so that they can be cast and removed from their mold faster and with greater ease without damaging or tearing the article itself.

Therefore, it is an object of this invention to provide a thermoplastic suitable for use as a mold release surface or coating for the preparation of molded articles.

In accordance with this invention, it has been discovered that a composition suitable as a mold release surface for preparing cast articles is a thermoplastic which is the result of grafting a silane to a poly(vinyl alcohol) by the method which comprises incrementally reacting about 2.5 to about 25 parts by weight of a silane with 100 parts by weight of a poly(vinyl alcohol), where said poly(vinyl alcohol) is characterized by having a molecular weight in the range of about 5000 to about 150,000 by having a 4 weight percent aqueous solution viscosity at 20°C in the range of about 5 to about 65 centipoises, and by containing about 70 to about 98 weight percent vinyl alcohol units, about 30 to about 2 weight percent vinyl acetate units, and correspondingly, about 0 to about 15 weight percent units of functional hydrocarbon radicals having the formula

where Y is selected from hydrogen, and functional groups selected from vinyl nitrous oxide, vinyl sulfonic acid, vinyl carboxylic acid, vinyl aldehyde, vinyl alcohol, vinyl amide and vinyl or ethylene vinyl thio units and where said silane is represented by the formula

where $a$ and $b$ are each integers selected from 0, 1, 2, 3 and 4, with the sum of $a$ and $b$ being 4, where X is a radical, reactive with the hydroxyl groups of said vinyl alcohol and said functional hydrocarbon radicals of said poly(vinyl alcohol), selected from hydrogen, hydroxyl, esters having the formula $-CO_2R$, alkoxy radicals having the formula $-OR$, primary and secondary amines having the formula $-RNH_2$ and $-RNH$, ether amines having the formula $-R'OHN_2$, isocyanates having the formula $-R'NCO$, primary nitrile radicals of the formula $-R'C \equiv N$, primary sulfanyl radicals of the formula $-R'SH$, and monoepoxide radicals selected from epoxy alkyl, epoxy oxy alkyl, epoxy alicyclic alkyl, and epoxy alicyclic radicals, where R, R' and said alkyl radicals are individually selected from saturated alkyl radicals having 1 to 6 carbon atoms and R' is further selected from cycloalkyl, aryl and alkaryl radicals containing 6 to 10 carbon atoms.

Therefore, the poly(vinyl alcohol) for this invention can generally be represented by the formula

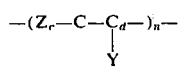

where Z is a mixture of vinyl alcohol and vinyl acetate units, $c$ is about 85 to 100 percent of $n$, $d$ is 0 to about 15 percent of $n$ and $n$ is the number of formula units in the monomer. The Y radical has been previously identified. It is preferred that the poly(vinyl alcohol) consists essentially of vinyl alcohol and vinyl acetate units.

However, if desired, it is intended for the poly(vinyl alcohol) that Y can be selected from various hereinbefore described vinyl units which provide functional groups reactive with the functional silane. Particularly representative of such functional groups are the $-NO_2$, $-SO_3H$, $-COOH$, $-CHO$, $-OH$, $-NH_2$, $-H$ and $-SH$ groups.

Poly(vinyl alcohol) is typically prepared by hydrolizing poly(vinyl acetate). In the practice of this invention, it is indeed preferred that the poly(vinyl alcohol) is simply poly(vinyl acetate) which has been hydrolized to an extent of about 70 to about 98 percent.

Various functional silanes can be used in the practice of this invention which contain functional groups which are reactive with the functional groups of the poly(vinyl alcohol). Particularly preferred functional silanes are those containing monoepoxy groups. Thus, preferred functional silanes can be of the formulas

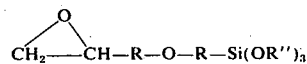

and

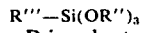

where R is selected from saturated alkyl radicals having 1 to 6 carbon atoms, R'' is a methyl or ethyl radical and R''' is selected from beta-3,4-epoxycycloalkyl and beta-(3,4-epoxycycloalkyl) alkyl radicals, where said cycloalkyl has 5–6 carbon atoms and said alkyl has 1 to 4 carbon atoms.

Representative of the various preferred functional silanes are chlorosilanes, such as trichlorosilane, methyl trichlorosilane, ethyl trichlorosilane, n propyl trichlorosilane, n butyl trichlorosilane, dimethyl dichlorosilane, trimethylchlorisilane, alkoxysilanes such as methyl trimethoxysilane, phenyl trimethoxysilane, methylphenydimethoxysilane, diphenyldimethoxysilane; organofunctional silanes, such as aminofunctional silane, methacrylate functional silane, polyaminofunctional silane, mercaptofunctional silane, vinylfunctional silane, chloroalkyl functional silane; and particularly monoepoxide organofunctional silane such as gamma-glycidoxypropyltrimethoxy silane and beta-(3,4-epoxycyclohexyl)ethyl trimethoxy silane.

In the practice of this invention, the required thermoplastic is prepared by reacting the poly(vinyl alcohol) with the functional silane in the presence of an organic solvent which is a solvent for the silane and essentially non-solvent for the poly(vinyl alcohol) and the required thermoplastic product. Solution solvents are those which can provide a solution containing at least 20 weight percent of the desired material in solution at about 25°C. Typically such organic solvents and non-solvents can be selected from liquid ketones, such as acetone, methyl ethyl ketone, methyl isobutyl ketone, diisobutyl ketone, as well as tetrahydrofuran and dimethyl formamide.

It is generally desired that the graft polymerization reaction be conducted in the presence of a catalyst in order to speed up the reaction. Generally suitable catalysts include tertiary amines, acidic catalysts, and organo-tin compounds. Representative of the various tertiary amines are triethyl amine, trimethyl amine, triisobutyl amine and tributyl amine. Representative of acid compounds are p-toluene sulfonic acid and p-benzene sulfonic acid. Representative of various organo-tin compounds are dibutyl tin dilaurate and stannous octoate.

For the reaction of this invention to produce the required thermoplastic, it is generally conducted to graft the poly(vinyl alcohol) with the functional silane in admixture with the organic solvent/non-solvent at a temperature in the range of about 0°C to the refluxing temperature, or about the boiling point, of the solvent itself. A generally preferred polymerization temperature is in the range of about 20°C to about 100°C, but not above the boiling point of the solution. The polymerization itself can be conducted as a batch process or on a continuous basis at atmospheric pressure or above or below atmospheric pressure. The graft reaction can take various periods of time depending primarily upon the reactants themselves and the polymerization temperature, such as in the range of about 5 to about 180 minutes.

In the practice of this invention, the graft polymer is generally applied to a substrate from a solvent solution. Thus, the graft polymer is dissolved in a suitable solvent and dried. Various solvents are generally suitable for this purpose such as water and simple alcohols such as ethanol, isopropanol, methanol and butanol, as well as their mixtures.

The graft polymer is generally placed in solution by mixing with the solvent and heating to a temperature in the range of about 50°C to about 90°C to form a solution containing from about 5 to about 15 weight percent of the graft polymer. The solution is then coated over the substrate surface and dried at a temperature in the range of about 60°C to about 95°C depending primarily on solvent used, to form a coating on the substrate having a thickness of about 0.02 to about 2 mils.

The coated substrate can then be used as a mold surface for molding various articles thereon and subsequently easily removing said molded articles. Representative of various materials which can be effectively molded on and released from the prepared graft polymer surface are polyvinyl chloride (homo and copolymers), ethylene-vinyl acetate copolymers, polyacrylates, polyurethanes, thermoplastic and thermoset polyesters, various polyolefins and blends of polymers.

The practice of this invention is further illustrated by reference to the following examples which are intended to be representative rather than restrictive of the scope of the invention. Unless otherwise indicated, all parts and percentages are by weight.

EXAMPLE I

To a reactor was charged 400 parts dimethyl formamide, 100 parts poly(vinyl alcohol), which was 87–89 percent hydrolized poly(vinyl acetate), characterized by having a molecular weight in the range of about 80,000 to about 96,000, and 0.25 part of p-toluene sulfonic acid as the catalyst. The mixture was adjusted to 60°C and to this mixture was then slowly added drop-wise the 20 parts of gamma-glycidoxypropyl-trimethoxy silane (obtainable from The Dow Corning Company under their identification of Z-6040) over a period of 1 hour. The mixture was allowed to react for an additional 1 hour. The dimethylformamide was removed under reduced pressure at a temperature of about 83°C for 4 hours.

The graft polymer was dissolved in a 40/60 weight ratio of ethanol and water and cast onto a polyvinyl alcohol belt and dried to form a film coating of the polymer having a thickness of about 0.5 mils. Over this release coating was applied polyvinyl chloride in solution tetrahydrofuran. The solution was evaporated at a temperature of about 50°C for a period of about 5 minutes, following which the resulting molded article was easily and quickly stripped from the release coating without damage to the molded article itself.

EXAMPLE II

To several reactors was charged various amounts of a solvent of dimethylformamide or methyl ethyl ketone, 100 parts poly(vinyl alcohol), which was a 87 to 89 percent hydrolized poly(vinyl acetate) characterized by molecular weight average of about 86,000 to about 130,000, 18 to 25 percent residual polyvinyl acetate and a 15 to 50 viscosity in centipoises of a 4 percent aqueous solution at 20°C, and various amounts of a catalyst selected from p-toluene sulfonic acid, and tributylamine. The mixtures were adjusted to about 60°C and various amounts of gamma-glycidoxypropyltrimethoxy silane solutions (obtainable from The Dow Corning Company under their identification of Z-6040) were slowly added drop-wise over a period of about 1 hour. The reaction was allowed to continue at the adjusted temperature of about 60°C for an additional hour. The dimethylformamide or methyl ethyl ketone solvent was then removed under a reduced pressure at a temperature in the range of about 50°C to about 140°C, depending on the solvent used, for about 2 to 5 hours. Yields of the resulting graft polymers range from about 95 to about 100 percent. The amounts of solvent, poly(vinyl alcohol), functional silane catalyst used for the various reactors are more clearly shown in the following Table 1.

TABLE 1

| Compound | Units | Formulation A | B | C | D |
|---|---|---|---|---|---|
| Dimethylformamide | ml | 500 | 500 | — | — |
| MEK | ml | — | — | 450 | 450 |
| PVA (20-60)* | gms | 50 | 50 | 50 | 50 |
| Silane | gms | 5 | 5 | 5 | 5 |
| Tributylamine | gms | .125 | — | .125 | — |
| p-Toluene sulfonic acid | gms | — | .125 | — | .125 |

*A poly vinyl alcohol (obtained from The Monsanto Company under the trade name Gelvatol) having a viscosity of about 21 to 25 centipoises as a 4 percent aqueous solution at 20°C, about 19.5 to about 22.7 weight percent residual PVA about 87 to about 89 percent hydrolized and having an average molecular weight of about 96,000.

EXAMPLE III

Portions of the recovered functional silane/poly(vinyl alcohol) graft polymers of Example II were dissolved in a 40/60 weight ratio of ethanol and water and cast onto a poly(vinyl alcohol) substrate. The solutions were dried to form a film coating of the graft polymers having a thickness of about 0.5 mils.

Likewise, for control purposes, a poly(vinyl alcohol) polymer solution (PVA 20–60) in a 40/60 ethanol/water solution was prepared and similarly coated onto a poly(vinyl alcohol) substrate to form a film thereon having a thickness of about 0.5 mils.

The stripping force necessary to remove the films from the poly(vinyl alcohol) substrates was measured and more clearly shown in the following Table 2.

TABLE 2

| Stripping Values | Units | A | B | C | D | Control |
|---|---|---|---|---|---|---|
| for PW (1) | gms | 45 | 55 | 45 | 55 | 70 |
| LPC (2) | gms | 140 | 155 | 140 | 160 | 230 |
| RCL (3) | gms | 210 | 230 | 210 | 230 | 310 |

(1) Highly plasticized PVC film
(2) Low plasticizer level PVC film
(3) Rigid PVC film The results shown in Table 2 clearly demonstrate the marked improvement of the graft polymer of this invention over the poly(vinyl alcohol) control.

The stripping test itself was conducted by pulling the test film from the substrate at an angle of about 45° at a temperature of about 50°C and at a rate of about 900 feet per minute. The force required for this purpose was recorded in grams. The test film samples used had rectangular dimensions of about 3 inches × 10 inches.

EXAMPLE IV

A graft polymer solution in ethanol/water, 40/60 weight ratio was prepared according to the method of Example II and coated onto a polyvinyl alcohol substrate.

Likewise, a control poly(vinyl alcohol) solution in ethanol/water, 40/60 weight ratio was prepared and coated onto a similar polyvinyl alcohol substrate.

Both substrates were dried at about 75°C for about 2 hours to form coatings having a thickness of about 1 mil.

The stripping force necessary to remove the plasticized polyvinyl chloride film from the graft polymer and the poly(vinyl alcohol) control coatings was measured and found to be 35 and 65 grams, respectively. Therefore, the marked improvement of the graft polymer over the poly(vinyl alcohol) control is easily demonstrated.

The stripping test was conducted in a manner in which the test film is pulled from the coating at an angle of about 45° at a temperature of about 50°C at a rate of about 900 feet per minute.

EXAMPLE V

To several reactors was charged 500 ml of tetrahydrofuran, 100 parts poly(vinyl alcohol), which was a 87–89 percent hydrolized poly(vinyl acetate), by molecular weight average 96,000, 19.5–22.7 percent residual poly(vinyl acetate) and a 21–25 viscosity in centipoises of a 4 percent aqueous solution at 20°C, and 0.25 part per 100 resin of a catalyst, tributyl amine. The mixtures were adjusted to about 55°C.

Various amounts of gamma-glycidoxypropyl trimethoxy silane solution (5–25 parts) were added by two methods. The first method used drop-wise incremental addition of the silane to the poly(vinyl alcohol) over a period of about one hour. The second method used bulk addition of the silane.

The reactions were allowed to continue at the adjusted temperature of 55°C for an additional hour and two hours respectively. The tetrahydrofuran was then removed and the grafted resin was completely dried at a temperature of 70°C for 2 hours. The amounts of solvent, poly(vinyl alcohol), silane, and catalyst used for the various reactors and the results of applying the resultant graft resins to the poly(vinyl alcohol) substrate are clearly shown in the following Table 3.

TABLE 3

| Formulation Procedure & Properties | Units | E | F | G | H | Control |
|---|---|---|---|---|---|---|
| THF | ml | 500 | 500 | 500 | 500 | — |
| PVA 20-60 | gms | 50 | 50 | 50 | 50 | 50 |
| Silane | gms | 5 | 5 | 10 | 10 | — |
| Tributylamine | gms | 0.125 | 0.125 | 0.125 | 0.125 | — |
| Bulk addition | — | Yes | No | Yes | No | — |
| Drop-wise addition | — | No | Yes | No | Yes | — |
| Reaction Temp | °C | 55 | 55 | 55 | 55 | — |
| Reaction Time | Hrs | 2 | 2 | 2 | 2 | — |
| Stripping Values* for | | | | | | |
| PW (1) | gms | 60 | 45 | 65 | 40 | 70 |
| EVA (2) | gms | 100 | 5 | 20 | 5 | 400 |

*(1) Highly plasticized PVC film
(2) Poly(Ethylene-vinyl acetate) film

These results shown in Table 3 clearly demonstrate the marked improvement of the graft polymer when prepared by drop-wise or slow incremental addition versus bulk addition of silane to the poly(vinyl alcohol).

EXAMPLE VI

Using procedures as outlined in Examples III and IV, the stripping force necessary to remove various films from the grafted poly(vinyl alcohol) coating prepared by the incremental (drop-wise) silane addition method was measured and are clearly shown in the following Table 4.

TABLE 4

| Sample | Silane Parts/100 PVA | Stripping Force Required in grams for | | | | |
|---|---|---|---|---|---|---|
| | | PW(1) | LPC(2) | RCL(3) | EVA(4) | VNC(5) |
| Control | 0 | 75 | 225 | 310 | 360 | 310 |
| I | 5 | 50 | 160 | 225 | 10 | 210 |
| J | 10 | 45 | 155 | 210 | 5 | 210 |
| K | 15 | 45 | 150 | 210 | 5 | 210 |
| L | 20 | 40 | 140 | 210 | 5 | 210 |
| M | 25 | 40 | 140 | 210 | 5 | 210 |
| Gauge (mils) | | 1.0 | 1.0 | 1.0 | 1.0 | 1.0 |

(1) highly plasticized PVC film
(2) low plasticizer level PVC film
(3) Rigid PVC film
(4) polyethylene vinyl acetate film
(5) poly(vinyl chloride-nitrile) film In the practice of this invention, it is required that the silane be incrementally reacted with the poly(vinyl alcohol). Such incremental addition is intended to be descriptive of slowly adding the silane to the reaction mixture such as by relatively small individual portions, by slow continuous addition or by slow intermittent continuous addition. The purpose is to prevent homopolymerization of the silane itself which would, indeed, be expected to form an adhesive rather than a product having release capabilities. It is preferred that the silane be added at sufficiently slow rate that less than about 5 weight percent of homopolymer is produced and especially preferred that less than about 1 weight percent homopolymer is produced based on the total product. Evidence of such homopolymer production is evidenced by the portion of the product which is insoluble in a 60/40 weight ratio of water/ethanol solvent mixture containing 10 weight percent of said product after 2 hours at a temperature of about 60°C. Visual evidence in such a mixture ranges from a cloudy solution for small amounts of the homopolymer to a flocculant suspension or a precipitate for greater amounts of the homopolymer content.

In the description of this invention, it is prescribed that various epoxy radicals can be attached to the silicon atom of the silane. It has been prescribed that such monoepoxide radicals can be selected from epoxy alkyl, epoxy oxy alkyl, epoxy alicyclic alkyl and epoxy alicyclic radicals. For clarification of such description, if necessary, representative examples of epoxy alkyl radicals are selected from propyloxy, butyloxy, and pentyloxy radicals; representative of various epoxy oxy alkyl radicals are glycidoxypropyl, glycidoxybutyl, and glycidoxyisopropyl radicals; representative of various epoxy alicyclic alkyl radicals are beta-(3,4-epoxycyclohexyl)ether and beta-(3,4-epoxycyclohexyl)propyl radicals; and representative of various epoxy alicyclic radicals are beta-3,4-epoxycyclohexyl and beta-3,4-epoxycyclopentyl radicals.

While certain representative embodiments and details have been shown for the purpose of illustrating the invention, it will be apparent to those having skill in this art that various modifications and changes may be made therein without departing from the spirit or scope of the invention.

What is claimed is:

1. A thermoplastic composition suitable as a mold release surface for preparing cast articles comprising a silane grafted poly(vinyl alcohol) prepared by the method which comprises incrementally reacting, in the presence of an organic solvent for the silane and essentially a non-solvent for said poly(vinyl alcohol) and the required thermoplastic composition product and at a temperature selected in the general range of about 0°C to about 100°C, about 2.5 to about 25 parts by weight of a silane with 100 parts by weight of poly(vinyl alcohol), where said poly(vinyl alcohol) is characterized by having a molecular weight in the range of about 5,000 to about 150,000, by having a 4 weight percent aqueous solution viscosity at 20°C in the range of about 5 to about 65 centipoises, and by containing about 70 to about 98 weight percent vinyl alcohol units, about 30 to about 2 weight percent vinyl acetate units, and correspondingly, about 0 to about 15 weight percent units of functional hydrocarbon radicals having the formula

where Y is selected from hydrogen, and functional groups selected from $-NO_2$, $-SO_3H$, $-COOH$, $-CHO$, $-OH$, $-NH_2$ and $-SH$ groups and where said silane is represented by the formula

where $a$ and $b$ are each integers selected from 0, 1, 2, 3 and 4 with the sum of $a$ and $b$ being 4, where R is a saturated alkyl radical having 1 to 6 carbon atoms, and where X is selected from hydrogen, hydroxyl, esters of the formula $-CO_2R$, alkoxy radicals of the formula $-OR$, primary and secondary amines of the formula $-RNH_2$ and $-RNH$, ether amines of the formula $-R'OHN_2$, isocyanates of the formula $-R'NCO$, primary nitrile radicals of the formula $-R'C \equiv N$, primary sulfanyl radicals of the formula $-R'SH$, and monoepoxide radicals selected from epoxy alkyl, epoxy oxy alkyl, epoxy alicyclic alkyl, and epoxy alicyclic radicals, where R' is selected from saturated alkyl radicals having 1 to 6 carbon atoms and cycloalkyl, aryl and alkaryl radicals containing 6 to 10 carbon atoms.

2. The composition of claim 1 where said silane has the formula

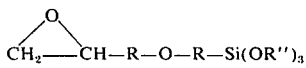

or $R''' - Si(OR'')_3$ where R'' is a methyl or ethyl radical and R''' is selected from beta-3,4-epoxycycloalkyl and beta-(3,4-epoxycycloalkyl) alkyl radicals, where said poly(vinyl alcohol) has the formula

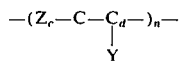

where Z is a mixture of vinyl alcohol and vinyl acetate units, $c$ is about 85 to about 100 percent of $n$, $d$ is about 0 to about 15 percent of $n$, $n$ is the number of formula units in the polymer and Y is a radical selected from —NO$_2$, —SO$_3$H, —COOH, —CHO, —OH, —NH$_2$, —H and —SH radicals.

3. The composition of claim 2 where R' of said silane is selected from saturated alkyl radicals having 1 to 4 carbon atoms.

4. The composition of claim 1 where said silane is selected from trichlorosilane, methyl trichlorosilane, ethyl trichlorosilane, n-propyl trichlorosilane, n-butyl trichlorosilane, dimethyl dichlorosilane, trimethylchlorosilane, methyl trimethoxysilane, phenyl trimethoxysilane, methylphenyldimethoxysilane, diphenyldimethoxysilane, aminofunctionalsilane, methacrylate functional silane, polyaminofunctional silane, mercaptofunctional silane, vinyl functional silane, chloroalkylfunctional silane, gamma-glycidoxypropyltrimethoxy silane and beta-(3,4-epoxycyclohexyl)ethyl trimethoxy silane.

5. The composition of claim 4 where said poly(vinyl alcohol) is prepared by hydrolizing poly(vinyl acetate) to an extent of about 70 to about 98 percent.

6. The composition of claim 5 where said silane is selected from gamma-glycidoxypropyltrimethoxy silane and beta-(3,4-epoxycyclohexyl)ethyl trimethoxy silane.

7. The composition of claim 1 where said solvent is selected from acetone, methyl ethyl ketone, methyl isobutyl ketone, diisobutyl ketone, tetrahydrofuran and dimethyl formamide and where said silane is incrementally reacted with said poly(vinyl alcohol) in the presence of a catalyst selected from tertiary amines, organo-tin compounds, p-toluene sulfonic acid and p-benzene sulfonic acid.

8. The composition of claim 7 where said catalyst is selected from triethyl amine, trimethyl amine, triisobutyl amine, tributyl amine, dibutyl tin dilaurate and stannous octoate.

9. The thermoplastic composition of claim 1 prepared by incrementally reacting about 2.5 to about 25 parts by weight of a silane selected from gamma-glycidoxypropyltrimethoxy silane and beta-(3,4-epoxycyclohexyl)ethyl trimethoxy silane with 100 parts by weight of a poly(vinyl alcohol) having a molecular weight in the range of about 5,000 to about 150,000 and by having a 4 weight percent aqueous solution viscosity at 20°C in the range of about 5 to about 65 centipoises, said poly(vinyl alcohol) being prepared by hydrolizing poly(vinyl acetate) to an extent of about 70 to about 98 percent, in the presence of a solvent selected from acetone, methyl ethyl ketone, methyl isobutyl ketone, diisobutyl ketone, tetrahydrofuran and dimethyl formamide and in the presence of a catalyst selected from triethyl amine, trimethyl amine, triisobutyl amine, tributyl amine, p-toluene sulfonic acid, p-benzene sulfonic acid, dibutyl tin dilaurate and stannous octoate.

10. The thermoplastic composition of claim 9 coated onto a substrate by application of a solution thereof in a solvent selected from water, ethanol, isopropanol, methanol and butanol and drying said solution.

11. A method of preparing the composition of claim 1 which comprises incrementally reacting about 2.5 to about 25 parts by weight of said silane with 100 parts by weight of said poly(vinyl alcohol) in the presence of an organic solvent which is a solvent for said silane and essentially a non-solvent for said poly(vinyl alcohol), said solvent selected from acetone, methyl ethyl ketone, methyl isobutyl ketone, diisobutyl ketone, tetrahydrofuran and dimethyl formamide, and in the presence of a catalyst selected from triethyl amine, trimethyl amine, triisobutyl amine, tributyl amine, p-toluene sulfonic acid, p-benzene sulfonic acid, dibutyl tin dilaurate and stannous octoate, said reaction being conducted at a temperature in the range of about 0°C to about the boiling point of said solvent.

12. The method according to claim 1 wherein said silane is selected from gamma-glycidoxypropyltrimethoxy silane and beta-(3,4-epoxycyclohexyl)ethyl trimethoxy silane, and where said poly(vinyl alcohol) is prepared by hydrolizing poly(vinyl acetate) to an extent of about 70 to about 98 percent.

13. The thermoplastic composition of claim 1 where, in the said silane, X is selected from said alkoxy radicals and from epoxy radicals selected from propyloxy, butyloxy, pentyloxy, glycidoxypropyl, glycidoxybutyl, glycidoxyisopropyl, beta-(3,4-epoxycyclohexyl)ethyl, beta-(3,4-epoxycyclohexyl)propyl, beta-3,4-epoxycyclohexyl and beta-3,4-epoxycyclopentyl radicals.

14. The composition of claim 1 prepared by the method which comprises adding said silane to said poly(vinyl alcohol) at a sufficiently slow rate that less than about 5 weight percent of silane homopolymer is produced based on the total product, where presence of such homopolymer is evidenced by the portion of the said product which is insoluble in a 60/40 weight ratio of water/ethanol solvent mixture containing 10 weight percent of said product after two hours at a temperature of about 60°C.

* * * * *